United States Patent
Ludwig et al.

(10) Patent No.: US 9,042,317 B2
(45) Date of Patent: May 26, 2015

(54) NON-GUARANTEED BIT RATE BEARER CONTROL IN A MOBILE COMMUNICATION NETWORK

(75) Inventors: Reiner Ludwig, Hürtgenwald (DE); Magnus Hallenstål, Täby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 382 days.

(21) Appl. No.: 13/515,039

(22) PCT Filed: Dec. 21, 2009

(86) PCT No.: PCT/EP2009/067698
§ 371 (c)(1),
(2), (4) Date: Jul. 26, 2012

(87) PCT Pub. No.: WO2011/076254
PCT Pub. Date: Jun. 30, 2011

(65) Prior Publication Data
US 2013/0070691 A1    Mar. 21, 2013

(51) Int. Cl.
*H04W 76/06* (2009.01)
*H04W 72/04* (2009.01)

(52) U.S. Cl.
CPC ............ *H04W 72/044* (2013.01); *H04W 76/06* (2013.01)

(58) Field of Classification Search
None
See application file for complete search history.

(56) References Cited

U.S. PATENT DOCUMENTS

| 2009/0264131 | A1* | 10/2009 | Wu et al. ................ 455/436 |
| 2009/0285183 | A1* | 11/2009 | Wu et al. ................ 370/331 |
| 2010/0040047 | A1* | 2/2010  | Castellanos Zamora et al. ................ 370/352 |
| 2012/0304246 | A1* | 11/2012 | Zhang et al. ................ 726/1 |
| 2013/0114417 | A1* | 5/2013  | Li et al. ................ 370/242 |

FOREIGN PATENT DOCUMENTS

WO    2009129248 A1    10/2009

OTHER PUBLICATIONS

3rd Generation Partnership Project. "LTE; General Packet Radio Service (GPRS) Enhancements for Evolved Universal Terrestrial Radio Access Network (E-UTRAN) Access (3GPP TS 23.401 version 9.2.0 Release 9)." Technical Specification, ETSI TS 123 401, V 9.2.0 Oct. 2009.*

(Continued)

Primary Examiner — Gregory Sefcheck
Assistant Examiner — Jenkey Van
(74) Attorney, Agent, or Firm — Coats & Bennett, PLLC

(57) ABSTRACT

In a mobile communication network, data traffic is mapped to a non-guaranteed bit rate bearer (50, 60) established between a gateway node (100) and a mobile terminal (200). The non-guaranteed bit rate bearer comprises a first sub-bearer (51, 61) between the mobile terminal (200) and an access node (120), a second sub-bearer (52, 62) between the access node (120) and an intermediate gateway node (110), and a third sub-bearer (53, 63) between the intermediate gateway node (110) and the gateway node (100). Releasing of the third sub-bearer (53, 63) is controlled on the basis of the first sub-bearer (51, 61) and/or the second sub-bearer (52, 62) being released.

9 Claims, 4 Drawing Sheets

(56) References Cited

OTHER PUBLICATIONS

3rd Generation Partnership Project. "LTE; General Packet Radio Service (GPRS) Enhancements for Evolved Universal Terrestrial Radio Access Network (E-UTRAN) Access (3GPP TS 23.401 version 8.7.0 Release 8)." Technical Specification, ETSI TS 123 401, V8.7.0, Oct. 2009, paragraph 5.4.4, Sophia-Antipolis Cedex, France.

3rd Generation Partnership Project. "Digital Cellular Telecommunications System (Phase 2+); Universal Mobile Telecommunications System (UMTS); LTE; Policy and Charging Control Architecture (3GPP TS 23.203 version 8.6.0 Release 8)." Technical Specification, ETSI TS 123 203, V8.6.0, Jun. 2009, pp. 1-115, Sophia-Antipolis Cedex, France.

* cited by examiner

NON-GUARANTEED BIT RATE BEARER CONTROL IN A MOBILE COMMUNICATION NETWORK

TECHNICAL FIELD

The present invention relates to techniques for non-guaranteed bit rate bearer control in a mobile communication network.

BACKGROUND

In mobile communication networks, it is known to direct data traffic of a certain type, e.g. related to a specific service or application, to a corresponding bearer. In this respect, a bearer is considered to be an information transmission context or path of defined characteristics, e.g. capacity, delay and/or bit error rate. Typically, a bearer allows for providing a desired quality of service (QoS). In this connection it is known to distinguish between guaranteed bit rate (GBR) bearers, in which a certain bit rate for transmitting the data traffic is guaranteed, and non-GBR bearers, in which there is no guaranteed bit rate for transmitting the data traffic.

According to the 3GPP ($3^{rd}$ Generation Partnership Project) technical specification 23.401, a bearer may be a concatenation of multiple sub-bearers: a radio bearer established between a mobile terminal and an access node, e.g. a base station or the like, an S1 bearer established between the access node and a serving gateway, and an S5/S8 bearer established between the serving gateway and a packet data network (PDN) gateway.

An established bearer may be dropped or released in certain events. A typical example is when the mobile terminal goes out of radio coverage. In this case the access node will release the radio bearer between the mobile terminal and the access node, which in turn causes the S1 bearer between the access node and the serving gateway to be released.

If for a non-GSR bearer the radio bearer and/or the S1 bearer is released, a so-called "bearer preservation" mode is entered. That is to say, the corresponding S5/S8 bearer is kept established.

The above behavior may result in problems with respect to the service layer not being notified of a loss of resources, e.g. a loss of the radio bearer or a loss of the S1 bearer. Since the S5/S8 bearer with respect to the PDN gateway is kept established, the PDN gateway does not become aware of a part of the bearer being lost and cannot notify any other service layer nodes of this event.

For example, according to the 3GPP specification 23.203, IMS signalling traffic (IMS: Internet Protocol Multimedia Subsystem) is typically mapped to a dedicated non-GBR bearer with QCI 5 (QCI: QoS Class Identifier). If such a non-GSR bearer is established, and the mobile terminal goes out of radio coverage, which causes the radio bearer to be dropped, IMS signalling is no longer possible between the IMS client on the mobile terminal and the IMS network. However, since the PDN gateway is not aware of the radio bearer being dropped, the IMS network will not be notified that IMS signalling is no longer possible.

Another example is charging of VoIP services (VoIP: Voice over Internet Protocol). Such services are typically charged within the service layer and not within the access network. In other words, for these services charging is typically not accomplished by a node which is aware of the radio bearer or the S1 bearer being active or not. If VoIP data traffic is mapped onto a non-GBR bearer, it is no longer possible that the service layer is notified if the radio bearer or the S1 bearer is lost, e.g. due to the mobile terminal going out of radio coverage. This in turn would cause charging at the service layer to continue, which is undesirable.

Accordingly, there is a need for efficient techniques for controlling the releasing of non-GBR bearers.

SUMMARY

According to an embodiment of the invention, a method of controlling a non-GBR bearer in a mobile communication network is provided. The bearer is established between a gateway node and a mobile terminal via an intermediate gateway node and an access node. The bearer comprises a first sub-bearer between the mobile terminal and the access node, a second sub-bearer between the access node and the intermediate gateway node, and a third sub-bearer between the intermediate gateway node and the gateway node. The method comprises controlling releasing of the third sub-bearer on the basis of the first sub-bearer and/or the second sub-bearer being released.

According to a further embodiment of the invention, a network component is provided. The network component comprises a control node configured to control a non-GBR bearer in a mobile communication network. The bearer is established between a gateway node and a mobile terminal via an intermediate gateway node and an access node. The bearer comprises a first sub-bearer between the mobile terminal and the access node, a second sub-bearer between the access node and the intermediate gateway node, and a third sub-bearer between the intermediate gateway node and the gateway node. The control node is configured to control, on the basis of the first sub-bearer and/or of the second sub-bearer being released, releasing of the third sub-bearer.

DETAILED DESCRIPTION OF EMBODIMENTS

In the following the invention will be explained in more detail by referring to exemplary embodiments and to the accompanying drawings. The illustrated embodiments relate to bearer control techniques in a mobile communication network, e.g. according to the 3GPP technical specifications. However, it is to be understood that the concepts as described herein may be applied to other types of communication networks as well.

Figure 1:
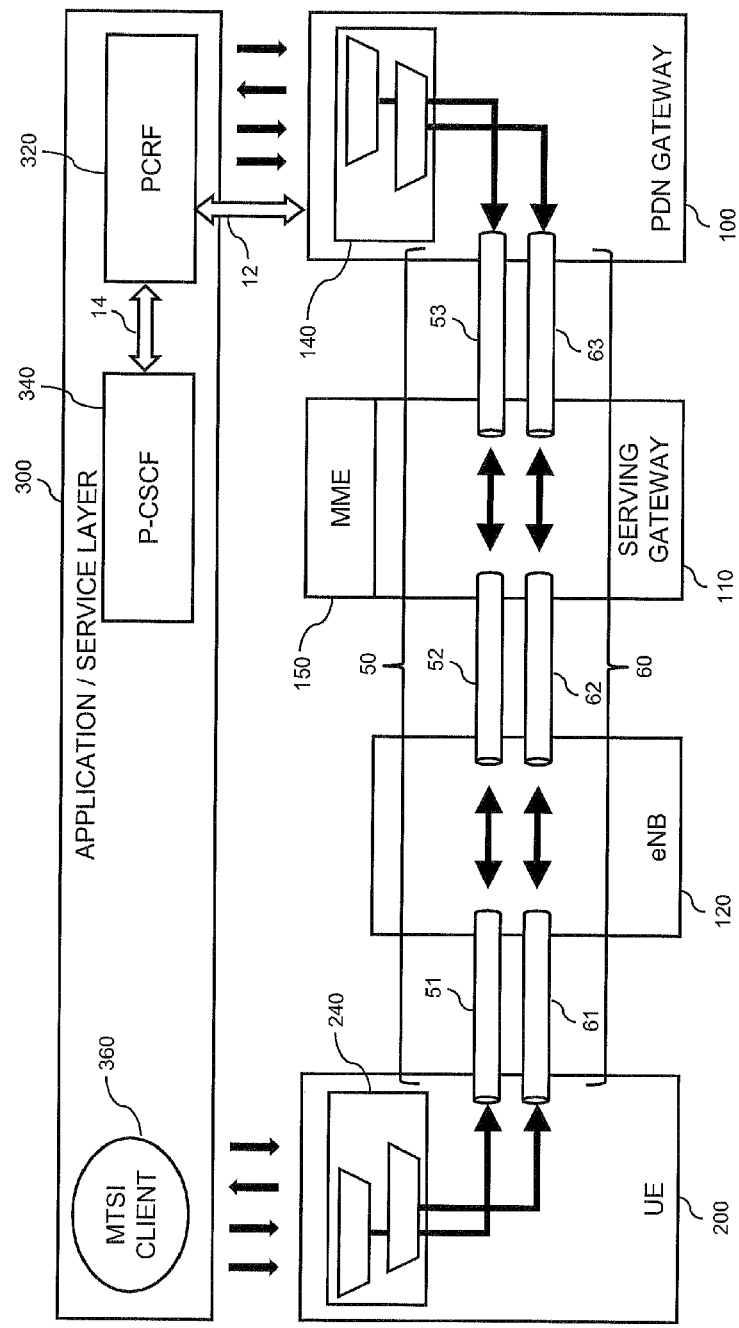
FIG. 1 schematically illustrates a mobile communication environment in which bearer control according to embodiments of the invention may be applied.

FIG. 1 schematically illustrates a mobile communication network environment in which bearer control is implemented in accordance with an embodiment of the invention.

The communication network environment comprises a mobile terminal 200, and a number of network components 100, 110, 120, 320, 340. More specifically, the network components comprise a gateway node 100, an intermediate gateway node 110, and an access node 120. In addition, the network components comprise a policy controller 320, and an application function 340. The mobile terminal 200 may be a mobile phone, a portable computer, or other type of user equipment (UE). Further, in the illustrated example the gateway node 100 is a Packet Data Network (PDN) Gateway according to the 3GPP technical specifications. The intermediate gateway node 110 is a Serving Gateway according to the 3GPP technical specifications, and the access node 120 is an eNodeB according to the 3GPP technical specifications. The policy controller 320 may be a Policy and Charging Rules Function (PCRF) according to the 3GPP technical specifications, and the application function 340 may be a Proxy Call Session Control Function (P-CSCF) according to the 3GPP technical specifications. The PCRF and the P-CSCF are illustrated as a part of an application/service layer 300. In addition, the application/service layer 300 comprises a client function 360 implemented at the mobile terminal 200. In the illustrated example, the client function 360 is a MTSI client (MTSI: Multimedia Telephony Service for IMS).

In addition, a control node 150 is provided. In the illustrated example, the control node 150 is associated with the intermediate gateway node 110 and is implemented as a Mobility Management Entity (MME) according to the 3GPP technical specifications.

It is to be understood that the above types of network components are merely exemplary and that other types of access nodes, intermediate gateway nodes, control nodes, and gateway nodes could be used as well. Moreover, various types of applications or services may be implemented in the application/service layer 300 and corresponding application functions and client functions may be used.

As illustrated in FIG. 1, dedicated bearers 50, 60 may be established between the mobile terminal 200 and the gateway node 100. Each of the bearers 50, 60 may carry downlink data traffic from the gateway node 100 to the mobile terminal 200 and/or uplink data traffic from the mobile terminal 200 to the gateway node 100. In the gateway node 100 the downlink data traffic is mapped to the bearers 50, 60 by a downlink data flow controller 140. This mapping is controlled in accordance with the type of data traffic. That is to say, data traffic of a certain type, e.g. data traffic related to a specific service or application, will be mapped to a corresponding one of the bearers 50, 60. Similarly, in the mobile terminal 200 uplink data traffic will be mapped to the bearers 50, 60 by an uplink data flow controller 240. Again, data traffic of a certain type, e.g. data traffic related to a specific service or application, will be mapped to a corresponding one of the bearers 50, 60. For example, the bearer 50 as illustrated in FIG. 1 may carry signalling data, e.g. SIP signalling data (SIP: Session Initiation Protocol), and the bearer 60 may carry packetized voice data, e.g. IMS-VoIP data.

The bearers 50, 60 ensure that the data traffic mapped thereto gets the resources it requires, e.g. in terms of QoS, as determined by the network operator. For example, if a bearer is used to transmit VoIP data at a given codec rate, then the bearer is established so as to ensure that the data traffic is transmitted between the gateway node 100 and the mobile terminal 200 without any congestion or congestion-related packet losses.

The bearers 50, 60 may each be associated with a corresponding QoS class indicator (QCI). In this connection, a QCI is defined as an indicator used as a reference to a predefined packet forwarding policy, and may be a scalar value between 1 and 256. According to the 3GPP technical specification 23.401, a QCI between 1 and 4 indicates that the associated bearer is a GBR bearer, whereas a QCI between 5 and 9 indicates that the associated bearer is a non-GBR bearer.

In the following, it will be assumed that the bearers 50, 60 as illustrated in FIG. 1 are non-GBR bearers. For example, the bearer 50 may be a non-GBR bearer associated with QCI 5, and the bearer 60 may be a non-GBR bearer associated with QCI 7.

However, it is to be understood that other types of bearers could be established as well, e.g. GBR bearers, and that there may be an arbitrary number of bearers, without affecting the control processes of non-GBR bearers as described herein.

As further illustrated in FIG. 1, each of the bearers 50, 60 is formed of three sub-bearers. In particular, the bearer 50 is formed of a first sub-bearer 51, a second sub-bearer 52 and a third sub-bearer 53, and the bearer 60 is formed of a first sub-bearer 61, a second sub-bearer 62, and a third sub-bearer 63. The first sub-bearers 51, 61 extend between the mobile terminal 200 and the access node 120. The second sub-bearers 52, 62 extend between the access node 120 and the intermediate gateway node 110. The third sub-bearers 53, 63 extend between the intermediate gateway node 110 and the gateway node 100. According to the illustrated embodiment, the first sub-bearers 51, 61 are radio bearers, the second sub-bearers 52, 62 are S1 bearers, and the third sub-bearers are S5/S8 bearers as specified in the 3GPP technical specifications 23.401.

In some situations, at least a part of the bearers 50, 60 may need to be released. Examples of such situations are when the mobile terminal 200 goes out of radio coverage and the first sub-bearer 51, 61 is lost, or when there is inactivity on the first sub-bearer, which may cause the access node 120 to release the second sub-bearer 52, 62. In the following, bearer control techniques will be described which relate to the handling of non-GBR bearers in such situations.

According to the bearer control techniques as described in the following, the control node 150 is configured to control releasing of the third sub-bearer 53, 63 on the basis of the first sub-bearer 51, 61 and/or the second sub-bearer 52, 62 being released. That is to say the control node 150 may monitor whether the first sub-bearer 51, 61 or the second sub-bearer 52, 62 is released and, if this is the case, decide to release the corresponding third sub-bearer 53, 63 as well. This decision may additionally be based on further conditions, e.g. on a release cause of the first sub-bearer 51, 61 and/or a release cause of the second sub-bearer 52, 62. According to an embodiment, the control node 150 is configured to release the third sub-bearer 53, 63 if the second sub-bearer 52, 62 is released and the cause for releasing of the second sub-bearer is different from inactivity on the first sub-bearer 51, 61. For example, if the cause for releasing the second sub-bearer 52, 62 is the mobile terminal 200 going out of radio coverage, which causes the first sub-bearer 51, 61 and the second sub-bearer 52, 62 to be released by the access node 120, the control node 150 may release the corresponding third sub-bearer 53, 63 as well. For some causes for releasing the first sub-bearer 51, 61 or the second sub-bearer 52, 62, the control node 150 may also maintain the corresponding third sub-bearer 53, 63. For example, if inactivity on the first sub-bearer 51, 61 causes the access node 120 to release the second sub-bearer 52, 62, the control node 150 may maintain the corresponding third sub-bearer 53, 63. The cause for releasing the first sub-bearer 51, 61 and/or the second sub-bearer may be indicated to the control node 150 by a corresponding message from the access node 120 or from the intermediate gateway node 110, e.g. by a bearer release report.

Figure 2:
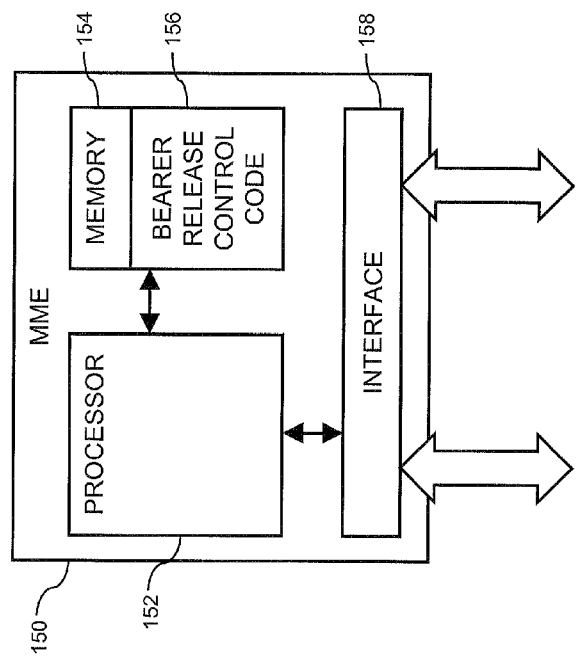
FIG. 2 schematically illustrates a network component according to an embodiment of the invention.

FIG. 2 schematically illustrates an exemplary implementation of the control node 150. As illustrated, the control node 150 may comprise a processor 152, a memory 154, and an interface 158. The processor is coupled to the memory 154 and to the interface 158. The memory 154 stores program code 156 to be executed by the processor 152. In particular, this program code comprises bearer release control code which causes the processor 152 to control the releasing of the third sub-bearer 53, 63 in the above-mentioned manner. In this process the interface 158 may be used to receive and send bearer setup request and/or to receive bearer release reports.

The above bearer control processes may be pre-configured in the control node 150, e.g. by the network operator. According to a further embodiment, this behaviour may be configurable on a per-bearer basis when establishing the bearer 50, 60. In this case, a bearer setup request may be used to indicate whether releasing of the first sub-bearer 51, 61 and/or of the second sub-bearer 52, 62 is to be monitored and reported and releasing of the third sub-bearer 53, 63 is to be controlled in the above-mentioned manner. A corresponding signalling flow is illustrated in FIG. 3.

Figure 3:
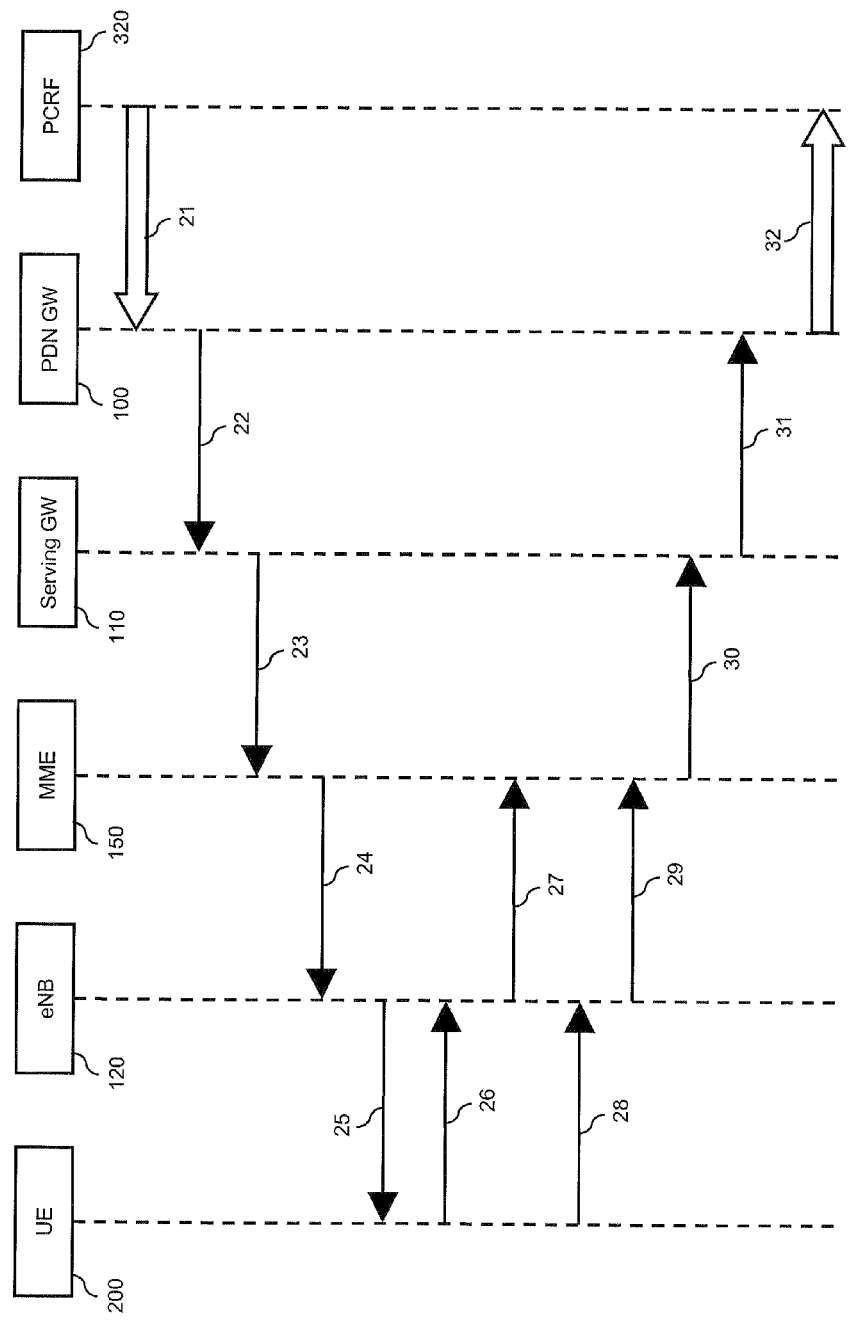
FIG. 3 shows a signalling diagram for schematically illustrating a method of bearer control according to an embodiment of the invention.

The components participating in the signalling flow of FIG. 3 are the policy controller 320, the gateway node 100, the intermediate gateway node 110, the control node 150, the access node 120, and the mobile terminal 200.

The process of FIG. 3 begins with the policy controller 320 sending a request 21 to the gateway node 100. The request 21 may be a request related to an IP-CAN (Internet Protocol Connectivity Access Network) session modification procedure. The request 21 may comprise a bearer release monitoring indicator, which indicates whether monitoring of releasing of the first sub-bearer 51, 61 and/or of the second sub-bearer 52, 62 is desired.

On the basis of the request 21, the gateway node 100 initiates establishing or modification of the non-GBR 50, 60 bearer. In particular, the gateway node 100 sends a bearer setup request 22 to the intermediate gateway node 110. The bearer setup request 22 includes the bearer release monitoring indicator to indicate whether releasing of the first sub-bearer 51, 61 and/or of the second sub-bearer 52, 62 is to be monitored and reported. The intermediate gateway node 110 receives the bearer setup request 22 and in turn sends a bearer setup request 23 to the control node 150. The bearer setup request transmitted from the intermediate gateway node 110 to the control node 150 again includes the bearer release monitoring indicator which indicates whether releasing of the first sub-bearer 51, 61 and/or of the second sub-bearer 52, 62 is to be monitored and reported.

The control node 150 sends a bearer setup request or a session management request 24 to the access node 120. The access node sends a message 25 to the mobile terminal 200. The message 25 may be a RRC connection reconfiguration message. The mobile terminal responds with a message 26 to the access node 120. The message 26 may be a RRC connection reconfiguration complete message.

Upon receiving the message 26 from the mobile terminal 200, the access node 120 sends a bearer setup response 27 to the control node 150, thereby acknowledging activation of the first sub-bearer 51, 61.

The mobile terminal 200 may also send a session management message 28 to the access node 120. The session management message 28 may be a Direct Transfer message. Upon receiving the session management message 28 from the mobile terminal 200, the access node 120 may send a session management response 29 to the control node 150.

The control node 150 then sends a bearer setup response message 30 to the intermediate gateway node 110 so as to acknowledge activation of the second sub-bearer.

The intermediate gateway node 110 sends a bearer setup response message 31 to the gateway node 100 so as to acknowledge activation of the third sub-bearer.

The gateway node 100 sends a response 32 to the policy controller 320 so as to acknowledge establishment of the bearer. The response 32 may be a IP-CAN session modification response message.

Further details of the messages 21, 22, 23, 24, 25, 26, 27, 28, 29, 30, 31, 32 can be taken from the 3GPP technical specification 23.401.

In the signalling flow of FIG. 3 the bearer setup request messages 22 and 23 may be used to control whether monitoring of releasing of the first sub-bearer 51, 61 and/or of the second sub-bearer 52, 62 and reporting of bearer release events is desired.

Moreover, these messages may also be used to configure whether or under which conditions such release events shall result in automatic releasing of the third sub-bearer 53, 63. This behaviour may in turn be controlled by the policy controller 320 by including a corresponding parameter into the request 21.

Figure 4:
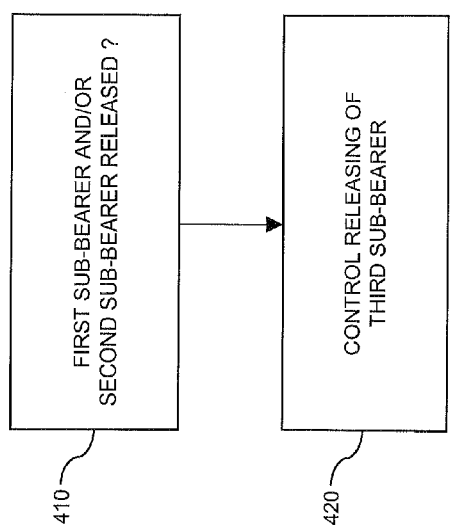
FIG. 4 shows a flowchart for illustrating a method of bearer control according to an embodiment of the invention.

FIG. 4 shows a flowchart for illustrating a method of controlling a non-GBR bearer in accordance with the above-described concepts.

In step 410, it is determined whether the first sub-bearer 51, 61 and/or the second sub-bearer 52, 62 is released. For this purpose, the first sub-bearer 51, 61 and/or the second sub-bearer 52, 62 may be monitored and/or bearer release report messages may be evaluated. Monitoring of the first sub-bearer 51, 61 and/or the second sub-bearer 52, 62 with respect to release events may be activated in response to a bearer release monitoring indicator in a bearer setup request received by the control node 150. Alternatively, the control node 150 may be pre-configured by the network operator to monitor releasing of the first sub-bearer 51, 61 and/or of the second sub-bearer 52, 62.

At step 420, releasing of the third sub-bearer 53, 63 is controlled on the basis of the first sub-bearer 51, 61 and/or the second sub-bearer 52, 62 being released. In some embodiments, the third sub-bearer 53, 63 may be released if the first sub-bearer 51, 61 and/or the second sub-bearer 52, 62 is released. In further embodiments, additional conditions may be applied when deciding whether to release the third sub-bearer 53, 63. For example, releasing of the third sub-bearer 53, 63 may further be controlled on the basis of a cause for releasing the first sub-bearer 51, 61 and/or a cause for releasing the second sub-bearer 52, 62. According to an embodiment, if the cause for releasing the second sub-bearer 52, 62 is in activity on the first sub-bearer 51, 61, the third sub-bearer 53, 63 may be maintained, and for other causes than inactivity on the first sub-bearer 51, 61, the third sub-bearer 53, 63 may be released.

Releasing of the third sub-bearer 53, 63 may be reported to the gateway node 100 in a bearer release report message. The gateway node 100 may then notify other network nodes of the third sub-bearer 53, 63 or the entire bearer 50, 60 being released and optionally also of the release cause.

According to the concepts as explained above, non-GBR bearers can be controlled in an efficient manner. In particular, undesired maintaining of the third sub-bearer 53, 63 in situations in which the first sub-bearer 51, 61 and/or the second sub-bearer 52, 62 has been dropped, e.g. due to the mobile terminal going out of radio coverage, can be avoided. This in turn allows for efficient usage of network capacities.

It is to be understood that the concepts as explained above are merely exemplary and susceptible to various modifications. For example, rather than using a separate control node for monitoring releasing of the first sub-bearer and/or of the second sub-bearer and controlling releasing of the third sub-bearer, corresponding control functionalities could also be integrated within the intermediate gateway node. Moreover, the above concepts may be applied in various types of mobile communication networks.

The invention claimed is:

1. A method of controlling a bearer in a mobile communication network, the method comprising:
receiving a bearer release report from an access node, the bearer release report concerning a sub-bearer of a non-guaranteed bitrate bearer established between a gateway node and a mobile terminal via an intermediate gateway node and the access node, the non-guaranteed bitrate bearer comprising:
a first sub-bearer established between the mobile terminal and the access node;
a second sub-bearer established between the access node and the intermediate gateway node, the second sub-bearer being an S1 bearer; and
a third sub-bearer established between the intermediate gateway node and the gateway node;
determining a cause for release of the S1 bearer from the bearer release report;
controlling release of the third sub-bearer based on the cause for release of the S1 bearer, the controlling comprising:
maintaining the third sub-bearer in response to the determined cause for release being inactivity on the first sub-bearer;
releasing the third sub-bearer in response to the determined cause for release being other than inactivity on the first sub-bearer.

2. The method of claim 1, further comprising monitoring whether at least one of the first and second sub-bearers is released.

3. The method of claim 1, further comprising:
receiving a bearer setup request, the bearer setup request comprising a bearer release monitoring indicator to indicate whether release of at least one of the first and second sub-bearers is to be monitored;
based on the bearer release monitoring indicator, monitoring release of at least one of the first and second sub-bearers.

4. The method of claim 1, wherein the first sub-bearer is a radio bearer, and the third sub-bearer is an S5/S8 bearer.

5. The method of claim 1, wherein the gateway node is a Packet Data Network Gateway, the intermediate gateway node is a Serving Gateway, and the access node is an eNodeB.

6. The method of claim 5, wherein the controlling release of the third sub-bearer is performed by a Mobility Management Entity associated with the Serving Gateway.

7. A network component, comprising:
a hardware processor and a memory, the memory containing instructions executable by the hardware processor whereby the network component is configured to:
receive a bearer release report from an access node, the bearer release report concerning a sub-bearer of a non-guaranteed bitrate bearer established between a gateway node and a mobile terminal via an intermediate gateway node and the access node, the non-guaranteed bitrate bearer comprising:
a first sub-bearer established between the mobile terminal and the access node;
a second sub-bearer established between the access node and the intermediate gateway node, the second sub-bearer being an S1 bearer; and
a third sub-bearer established between the intermediate gateway node and the gateway node;
determine a cause for release of the S1 bearer from the bearer release report;
control release of the third sub-bearer based on the cause for release of the S1 bearer, wherein to control release the network component is configured to:
maintain the third sub-bearer in response to the determined cause for release being inactivity on the first sub-bearer;
release the third sub-bearer in response to the determined cause for release being other than inactivity on the first sub-bearer.

8. The network component of claim 7:
wherein the gateway node is a Packet Data Network Gateway;
wherein the intermediate gateway node is a Serving Gateway;
wherein the access node is an eNodeB;
wherein the network component is a Mobility Management Entity.

9. A computer program product stored in a non-transitory computer readable medium for controlling a bearer in a mobile communication network, the computer program product comprising software instructions which, when run on a processor of a control node, causes the processor to:
receive a bearer release report from an access node, the bearer release report concerning a sub-bearer of a non-guaranteed bitrate bearer established between a gateway node and a mobile terminal via an intermediate gateway node and the access node, the non-guaranteed bitrate bearer comprising:
a first sub-bearer established between the mobile terminal and the access node;
a second sub-bearer established between the access node and the intermediate gateway node, the second sub-bearer being an S1 bearer; and
a third sub-bearer established between the intermediate gateway node and the gateway node;
determine a cause for release of the S1 bearer from the bearer release report;
control release of the third sub-bearer based on the cause for release of the S1 bearer, wherein to control release the software instructions cause the processor to:
maintain the third sub-bearer in response to the determined cause for release being inactivity on the first sub-bearer;
release the third sub-bearer in response to the determined cause for release being other than inactivity on the first sub-bearer.

* * * * *